US010564736B2

(12) United States Patent
Lee et al.

(10) Patent No.: US 10,564,736 B2
(45) Date of Patent: Feb. 18, 2020

(54) DIGITAL PEN, TOUCH SYSTEM, AND METHOD FOR PROVIDING INFORMATION THEREOF

(71) Applicant: SAMSUNG ELECTRONICS CO., LTD., Gyeonggi-do (KR)

(72) Inventors: Jae-kwang Lee, Suwon-si (KR); Jeong-hyun Park, Suwon-si (KR); Seung-sin Lee, Yongin-si (KR); Kyoung-oh Choi, Seoul (KR); Young-hun Choi, Hwaseong-si (KR); Young-ran Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/895,667

(22) Filed: Feb. 13, 2018

(65) Prior Publication Data

US 2018/0173330 A1    Jun. 21, 2018

Related U.S. Application Data

(63) Continuation of application No. 15/094,418, filed on Apr. 8, 2016, now Pat. No. 9,916,019.

(30) Foreign Application Priority Data

Apr. 9, 2015    (KR) .................. 10-2015-0050251

(51) Int. Cl.
   *G06F 3/0354*    (2013.01)
   *G06F 1/3212*    (2019.01)
   (Continued)

(52) U.S. Cl.
   CPC ........ *G06F 3/03545* (2013.01); *G06F 1/3212* (2013.01); *G06F 1/3259* (2013.01);
   (Continued)

(58) Field of Classification Search
   CPC .... G06F 3/03545; G06F 3/0416; G06F 3/044; G06F 1/3212; G06F 1/3259;
   (Continued)

(56) References Cited

U.S. PATENT DOCUMENTS 5,629,500 A    5/1997  Fukuzaki et al.
6,515,654 B1   2/2003  Liao
(Continued)

FOREIGN PATENT DOCUMENTS

EP    0587200 A1    3/1994
EP    2698260 A1    2/2014

OTHER PUBLICATIONS

Communication dated Aug. 16, 2016, from the European Patent Office in counterpart European Application No. 16164406.7.
(Continued)

*Primary Examiner* — Liliana Cerullo
(74) *Attorney, Agent, or Firm* — Sughrue Mion, PLLC

(57) ABSTRACT

A digital pen, a touch system and a method for providing information thereof are provided. The touch system may include a display apparatus and a digital pen having a battery. The digital pen may be configured to sense a battery status of the battery, generate a signal indicating a location of the stylus with respect to the display apparatus. The signal may have a frequency corresponding to the battery status, and transmit the signal to the display apparatus. The display apparatus may be configured to receive the signal, analyze the signal, and acquire the location of the stylus and the battery status.

7 Claims, 17 Drawing Sheets

(51) Int. Cl.
*G06F 1/3234* (2019.01)
*G06F 3/041* (2006.01)
*G06F 3/044* (2006.01)

(52) U.S. Cl.
CPC ............ *G06F 1/3262* (2013.01); *G06F 3/044* (2013.01); *G06F 3/0416* (2013.01); *G06F 2203/0336* (2013.01); *G06F 2203/0338* (2013.01); *Y02D 10/155* (2018.01); *Y02D 10/174* (2018.01)

(58) Field of Classification Search
CPC ........... G06F 1/3262; G06F 2203/0336; G06F 2203/0338; Y02B 60/1253; Y02B 60/1292
See application file for complete search history.

(56) References Cited

U.S. PATENT DOCUMENTS

| | | | |
|---|---|---|---|
| 9,916,019 B2* | 3/2018 | Lee | G06F 3/03545 |
| 2003/0044069 A1* | 3/2003 | Ku | G06F 3/03545 382/187 |
| 2005/0024346 A1 | 2/2005 | Dupraz | |
| 2007/0008294 A1 | 1/2007 | Huang | |
| 2008/0156546 A1 | 7/2008 | Hauck | |
| 2009/0078476 A1* | 3/2009 | Rimon | G06F 3/03545 178/18.03 |
| 2011/0297457 A1* | 12/2011 | Yeh | G06F 3/03545 178/19.01 |
| 2012/0068975 A1 | 3/2012 | Wei et al. | |
| 2013/0106709 A1* | 5/2013 | Simmons | G06F 3/044 345/173 |
| 2013/0265265 A1 | 10/2013 | Stern | |
| 2014/0104188 A1 | 4/2014 | Bakken | |
| 2014/0168176 A1 | 6/2014 | Nowatzyk et al. | |
| 2014/0192030 A1 | 7/2014 | Ryshtun et al. | |
| 2014/0267186 A1 | 9/2014 | Kreek et al. | |
| 2016/0147320 A1 | 5/2016 | Krunwelman et al. | |
| 2016/0179223 A1 | 6/2016 | Konanur et al. | |

OTHER PUBLICATIONS

International Search Report, issued by International Searching Authority in International Application No. PCT/KR2016/003671, dated Jul. 25, 2016, (PCT/ISA/210).

Written Opinion, issued by International Searching Authority in International Application No. PCT/KR2016/003671, dated Jul. 25, 2016, (PCT/ISA/237).

Communication dated Jun. 5, 2018, issued by the European Patent Office in counterpart European Application No. 16164406.7.

* cited by examiner

10

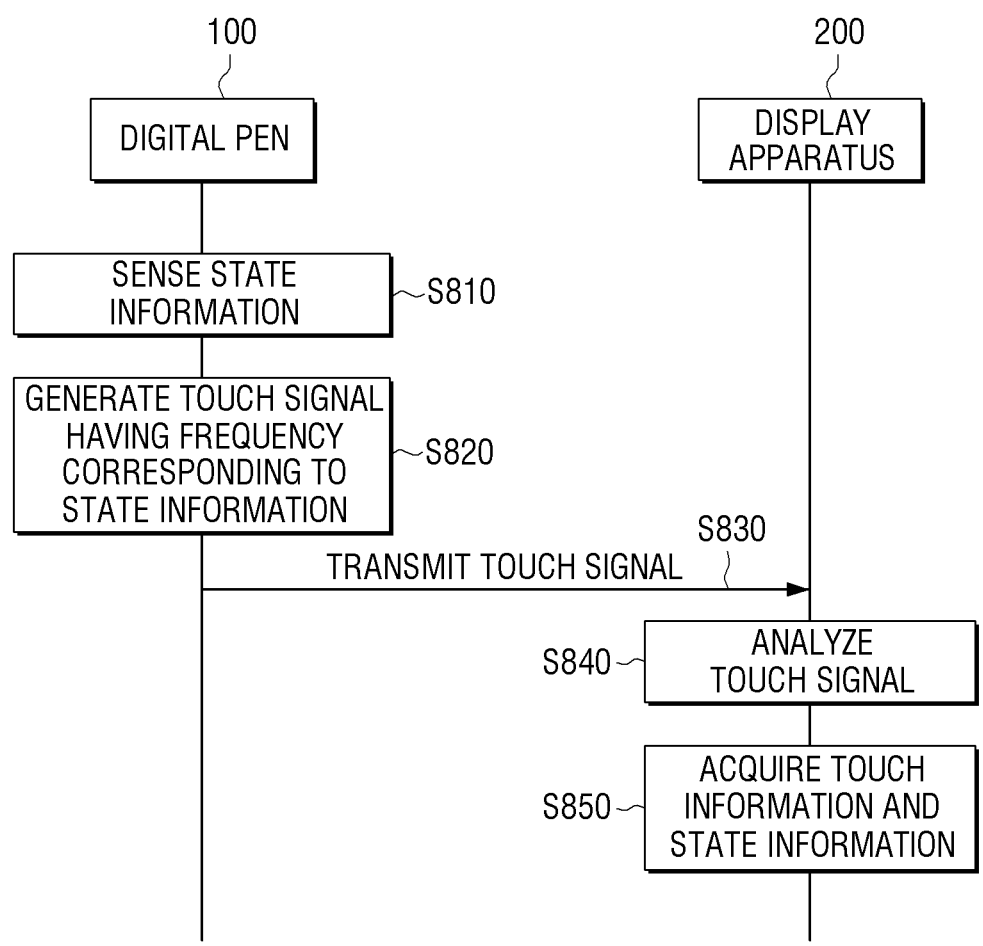

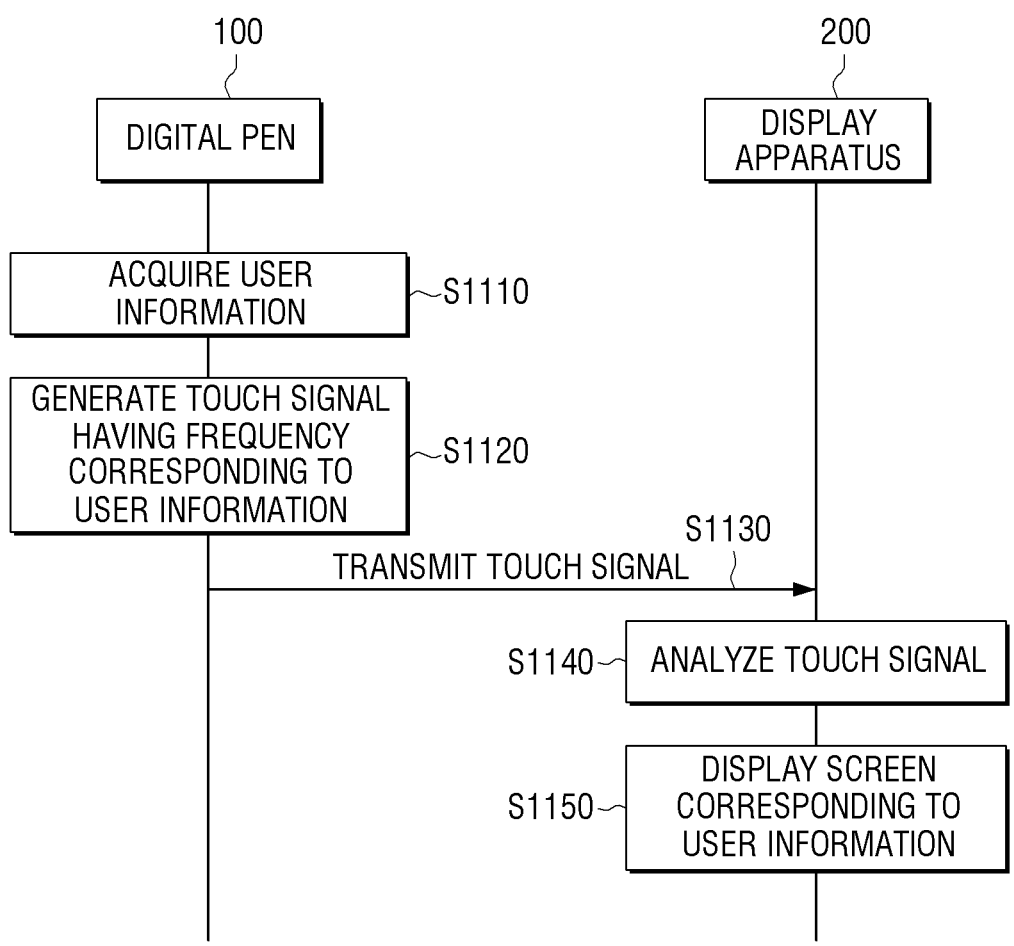

DIGITAL PEN, TOUCH SYSTEM, AND METHOD FOR PROVIDING INFORMATION THEREOF

CROSS-REFERENCE TO RELATED APPLICATIONS

This application is a Continuation of U.S. application Ser. No. 15/094,418, filed Apr. 8, 2016, which claims priority from Korean Patent Application No. 10-2015-0050251, filed in the Korean Intellectual Property Office on Apr. 9, 2015, the disclosure of which is incorporated herein by reference.

BACKGROUND

1. Field

Aspects of exemplary embodiments relate to a digital pen, a touch system and a method for providing information thereof, and more particularly, to a digital pen that generates a touch signal having a frequency corresponding to state information of the digital pen, a touch system and a method for providing information thereof.

2. Description of the Related Art

Recently, a touch interface has offered an intuitive environment for users. In particular, various touch interface methods have been provided, including a touch interface that interacts with the user's hands and a touch interface that operates in conjunction with a digital pen. A digital pen is said to be of an "active" type when the digital pen is capable of generating a touch signal that corresponds to a touch input. Active digital pens typically require a portable power source, such as a battery, in order to generate the touch signal.

Meanwhile, a conventional digital pen does not have the capability to provide, to a paired device, information related to the batter. Thus, the battery status of the digital pen is largely unknown to the paired device until the digital pen is no longer in operation. In other words, the battery status of a conventional digital pen can be recognized only when the battery of the digital pen is completely discharged, thereby compromising user convenience.

Accordingly, there exists a need for recognizing state information, such as battery power status, of a digital pen more conveniently and effectively.

SUMMARY

An aspect of the exemplary embodiments relates to a digital pen or stylus which generates a signal having different frequencies depending on state information of the digital pen, and provides the touch signal to a display apparatus so that a user may check the state information of the digital pen more conveniently. A touch system and a method for providing information thereof are also provided.

According to an exemplary embodiment, there is provided a system including a display apparatus and a stylus having a battery. The stylus may be configured to sense a battery status of the battery, generate a signal indicating a location of the stylus with respect to the display apparatus, wherein the signal has a frequency corresponding to the battery status, and transmit the signal to a display apparatus. The display apparatus may be configured to, in response to receiving the signal, analyze the signal and acquire the location of the stylus and the battery status.

The stylus may also sense state information of the stylus, generate a signal having a frequency corresponding to the state information of the stylus, and transmit the second signal to the display apparatus. The state information may include a touch coordinate, a touch pressure, or a stylus usage mode.

The stylus, in response to the battery status indicating that a battery voltage of the battery is less than or equal to a predetermined value, may generate the signal having a first frequency, or in response to the battery status indicating that that the battery voltage is above the predetermined value, generate the signal having a second frequency different from the first frequency.

The display apparatus, in response to receiving the signal having the first frequency, may output a message indicating that the battery of the stylus has low power.

According to an aspect of an exemplary embodiment, there is provided a method for providing information in a touch system which includes a stylus and a display apparatus. The method may include sensing a battery status of a battery in the stylus, generating a signal indicating a location of the stylus with respect to the display apparatus, the signal having a frequency corresponding to the battery status, and transmitting the signal from the stylus to the display apparatus.

The method may further include sensing state information of the stylus, generating a signal having a frequency corresponding to the state information of the stylus, and transmitting the signal from the stylus to the display apparatus. The state information may include a touch coordinate, a touch pressure, or a stylus usage mode.

The frequency may be a first frequency when the battery status indicates that a battery voltage of the battery is less than or equal to a predetermined value, and the frequency may be a second frequency different from the first frequency when the battery status indicates that the battery voltage is above the predetermined value.

The method may further include, in response to the display apparatus receiving the first signal having the first frequency, analyzing the signal and acquiring the battery status of the battery by the display apparatus, and outputting a message indicating that the battery of the stylus has low power.

According to an aspect of an exemplary embodiment, there is provided a stylus including a battery powering the stylus; a sensor configured to sense state information of the stylus, the state information including a battery status of the battery; a signal generator configured to generate a signal indicating a location of the stylus with respect to a display apparatus, the signal having a frequency corresponding to the battery status; and a signal transmitter configured to transmit the signal to a display apparatus.

The sensor may further include a comparer configured to compare a voltage level of the battery with a predetermined voltage value.

The signal may be an electromagnetic interference (EMI) signal, and the signal generator may include a frequency divider configured to divide the EMI signal into a predetermined frequency according to the battery status of the battery.

The signal generator may include an oscillation circuit configured to generate the EMI signal having a predetermined frequency by switching a capacitor included in the oscillation circuit according to the battery status of the stylus.

The stylus may further include a user recognition unit configured to recognize a user of the digital pen. The signal generator may be further configured to generate a signal having a frequency corresponding to the user recognized via the user recognition unit, and the signal transmitter may be further configured to transmit the generated signal to the display apparatus.

The stylus may further include an input unit configured to select a color mode. The signal generator may be further configured to generate a signal having a frequency corresponding to the color mode selected via the input unit. The signal transmitter may be further configured to transmit the generated signal to the display apparatus.

According to an aspect of an exemplary embodiment, there is provided a method for providing information of a stylus. The method may include recognizing a user of the stylus, generating a signal having a frequency corresponding to an identity of the user, and transmitting the signal from the stylus to a display apparatus.

The method may further include sensing a battery status of a battery of the stylus by comparing a battery voltage of the stylus with a predetermined voltage value, generating a signal having a frequency corresponding to the battery status, and transmitting the signal from the stylus to the display apparatus.

The signal may be an EMI signal generated via a frequency divider, which divides the EMI signal into a predetermined frequency according to the identity of the user.

The EMI signal may be generated via an oscillation circuit by switching a capacitor included in the oscillation circuit according to the identity of the user.

The method may further include recognizing a second user of the stylus, generating a second signal having a second frequency corresponding to a second identity of the second user, and transmitting the second signal from the stylus to the display apparatus. The second frequency may be different from the first frequency.

The method may further include selecting a color mode according to a user command received via the stylus, generating a signal having a frequency corresponding to the selected color mode, and transmitting the signal from the stylus to the display apparatus.

BRIEF DESCRIPTION OF THE DRAWINGS

The above and/or other aspects will be more apparent by describing certain exemplary embodiments with reference to the accompanying drawings, in which:

FIG. 8 is a sequence diagram illustrating a method for providing information about a touch system according to an exemplary embodiment;

FIG. 11 is a sequence diagram illustrating a method of providing information of a touch system according to an exemplary embodiment.

DETAILED DESCRIPTION OF EXEMPLARY EMBODIMENTS

Specific exemplary embodiments will be described with reference to accompanying drawings and detailed explanation. However, the exemplary embodiments are not necessarily limited to a specific embodiment form. Instead, modifications, equivalents and replacements included in the disclosed concept and technical scope of this specification may be employed. While describing exemplary embodiments, descriptions of well-understood technologies are omitted, to avoid obscuring the exemplary embodiments.

In the present disclosure, relational terms such as first and second, and the like, may be used to distinguish one entity from another entity, without necessarily implying any actual relationship or order between such entities.

The terms used in the following description are provided to explain a specific exemplary embodiment and are not intended to be limiting. A singular term includes a plural form unless otherwise indicated. The terms, "include," "comprise," "is configured to," etc. are used to indicate that there are features, numbers, steps, operations, elements, parts or combinations thereof, and does not exclude the possibilities of combination or addition of one or more features, numbers, steps, operations, elements, parts or combination thereof.

In an exemplary embodiment, 'a module' or 'a unit' performs at least one function or operation, and may be realized as hardware, software, or combination thereof. In addition, a plurality of 'modules' or a plurality of 'units' may be integrated into at least one module and may be realized as at least one processor except for 'modules' or 'units' that should be realized in a specific hardware.

Figure 1:
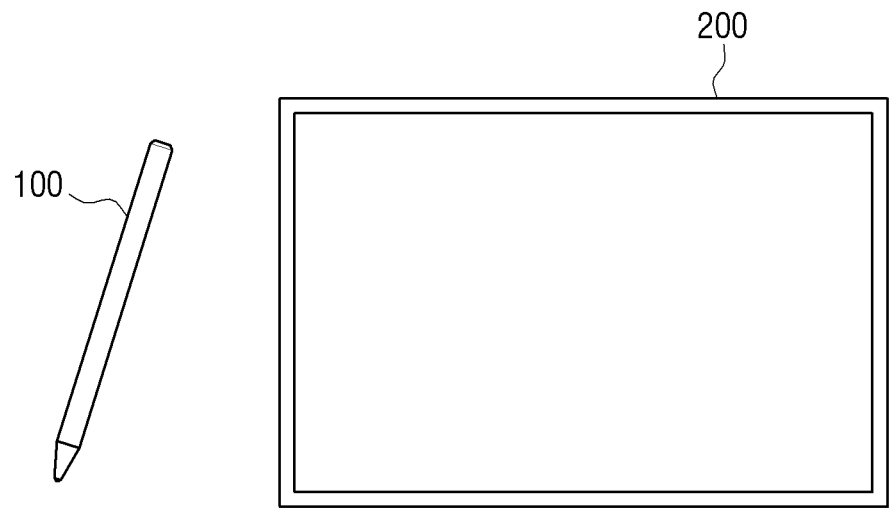
FIG. 1 is a view illustrating a touch system according to an exemplary embodiment.

Certain aspects of an exemplary embodiment will now be described in greater detail with reference to the accompanying drawings. FIG. 1 is a view illustrating a touch system 10 according to an exemplary embodiment. The touch system 10 includes a digital pen 100 and a display apparatus 200. The digital pen 100 may be a digital input device designed to mimic the look and feel of a traditional writing instrument such as a pen or pencil while adding more sophisticated features such as generating and transmitting input commands with regard to a point in space. The digital pen 100 may also be referred to as a digital pencil, a stylus, or a stylus pen. A user of the digital pen 100 may hold the digital pen 100 like one might hold a pen or pencil, and tap or write on a sensing surface of a device, such as a touchscreen or a graphics tablet, to provide user input to the device. According to an aspect of an exemplary embodiment, the display apparatus 200 may be implemented with an electronic blackboard, but this is only an example. The display apparatus 200 may be a television, a smart TV, a desktop computer, a laptop computer, a mobile device, a tablet computer, a smartphone, a wearable computing device, a smart watch, a monitor, a kiosk, etc.

The display apparatus 200 may acquire touch coordinates regarding a point touched by the digital pen 100 using a touch signal received from the digital pen 100. Throughout this disclosure, the term "touch" and its variants may not only apply to situations where a digital pen makes a physical contact with a surface of a display, but also to situations where the digital pen may merely hover over, point to, or otherwise designate a point on the surface. According to an aspect of an exemplary embodiment, the digital pen 100 and the display apparatus 200 may acquire coordinates regarding a point touched by a user using an electromagnetic interference (EMI) signal. The EMI signal is also called a radio-frequency interference (RFI) signal.

In particular, the display apparatus 200 may include a sensor sheet (also referred to as a "digitizer") that is arranged substantially parallel to the surface area of the display screen of the display apparatus 200 to sense an EMI touch signal, which is output from the digital pen 100. Accordingly, the display apparatus 200 may recognize, on the sensor sheet, a point where an EMI touch signal emitted from the digital pen 100 is sensed as the digital pen 100 comes in contact with, hovers over, or points to the point. According to an aspect of an embodiment, the EMI touch signal may have a radio frequency in the range of 200-300 KHz.

In particular, the digital pen 100 may sense state information of the digital pen 100 and generate a touch signal having a frequency corresponding to the state information. According to an aspect of an exemplary embodiment, the digital pen 100 may detect the power status of the battery that powers the digital pen 100, generate a touch signal having a frequency that corresponds to the battery power status of the digital pen 100, and then transmit the generated touch signal to the display apparatus 200. Specifically, if the battery voltage of the digital pen 100 is less than or equal to a predetermined value, then the digital pen 100 may generate a first touch signal having a first frequency, and if the battery voltage is greater than the predetermined value, the digital pen 100 may generate a second touch signal having a second frequency. The signal may also indicate a location of the stylus with respect to the display apparatus 200. The location can be represented by one or more coordinates. The location may be encoded into the signal by means other than altering the frequency of the signal. The digital pen 100 may then output the first touch signal or the second touch signal to the display apparatus 200.

The display apparatus 200 may acquire touch information regarding a point touched by the digital pen 100 and state information of the digital pen 100 based on the touch signal output from the digital pen 100. In particular, the display apparatus 200 may display a graphical object, such as a dot, a cursor, a pointer, a crosshair, and the like, at the touched point based on the acquired touch information, and perform one or more additional actions based on the acquired state information of the digital pen 100. When the display apparatus 200 receives from the digital pen 100 a touch signal that includes battery information of the digital pen 100, the display apparatus 200 may acquire the battery information of the digital pen 100 based on the touch signal, and provide a graphical element in a graphical user interface (GUI) to convey the battery information to the user of the display apparatus 200. For example, the graphical element can be displayed on a display screen of the display apparatus 200.

Thus, according to the above-described exemplary embodiments, a user may check the status of the digital pen with more ease and convenience.

Figure 2:
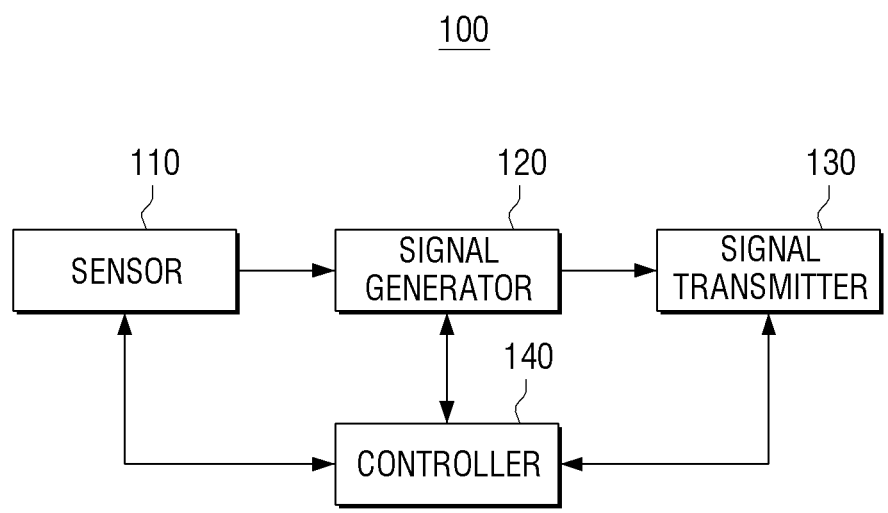
FIG. 2 is a block diagram illustrating a configuration of a digital pen according to an exemplary embodiment.

Hereinafter, the digital pen 100 according to an exemplary embodiment will be described with reference to FIGS. 2 to 4B. FIG. 2 is a block diagram illustrating a configuration of the digital pen 100 according to an exemplary embodiment. As illustrated in FIG. 2, the digital pen 100 may include a sensor 110, a signal generator 120, a signal transmitter 130, and a controller 140. Each of the components shown in FIG. 2 may be implemented with a hardware circuit or processor, a software module stored in a computer-readable medium, or a combination of both hardware and software components.

The sensor 110 may sense state information of the digital pen 100. In particular, the sensor 110 may sense battery information of the digital pen 100. The battery information may include battery voltage, expected battery life, remaining battery life, battery type, and the like. The sensor 110 may sense how the battery voltage of the digital pen 100 compares to a predetermined voltage. The predetermined voltage may be a minimum or threshold voltage level required for the proper operation of the digital pen 100. Alternatively, the threshold voltage level may be slightly higher or lower than the minimum voltage level required by the digital pen 100. The state information may also contain information pertaining to a pen input such as pressure sensitivity.

Meanwhile, in the above exemplary embodiment, the sensor 110 or controller 140 may compare voltage levels to determine whether the voltage level of the digital pen 100 is greater than a reference voltage, but this is only an example. According to an aspect of an exemplary embodiment, the voltage level of the digital pen 100 according to the battery information maybe compared against a plurality of reference voltages. In other words, the battery information of the digital pen 100 may be divided into a plurality of stages and provided to a user. The sensor 110 may include a plurality of comparers and compare the battery voltage of the digital pen 100 with a plurality of reference voltages. For example, the sensor 100 may compare the battery voltage of the digital pen 100 with a first reference voltage (e.g., 0.8 V) and a second reference voltage (e.g., 0.4 V). As a further example, the battery level of the digital pen 100 may be considered Stage 1 if the battery voltage is equal to or below 0.4 V, Stage 2 if the battery voltage is above 0.4 V and equal to or below 0.8 V, and Stage 3 if the battery voltage is above 0.8 V.

In addition, in the above exemplary embodiment, the sensor 100 may compare the battery voltage of the digital pen 100 with a reference voltage, but this is only an example. The sensor 100 may sense the current battery voltage of the digital pen 100 itself.

The signal generator 120 may generate a touch signal having a frequency corresponding to state information of the digital pen 100. The state information may be determined based on what is sensed by the sensor 110. In particular, the signal generator 120 may generate an EMI touch signal having a frequency corresponding to the battery information of the digital pen 100 sensed by the sensor 110.

Specifically, if the sensor 110 determines that the current battery voltage of the digital pen 100 is greater than or equal to a reference voltage, the signal generator 120 may generate a first EMI touch signal having a first frequency (e.g., 250 KHz), and if the sensor 110 determines that the battery voltage of the digital pen 100 is less than the reference voltage, the signal generator 120 may generate a second EMI touch signal having a second frequency (e.g., 200 KHz).

The signal generator 120 may change the frequency of the EMI touch signal by using an oscillator or a crystal. For example, the frequency of the EMI touch signal may be changed by switching a capacitance included in an LC oscillation circuit.

The signal transmitter 130 may emit an EMI touch signal generated by the signal generator 120 such that the signal can be detected by other devices. In particular, the signal transmitter 130 may wirelessly transmit an EMI touch signal to the display apparatus 200. The EMI signal may carry state information of the digital pen 100 including coordinates, pressure information, battery information, and the like.

The controller 140 may control the overall operations of the digital pen 100. In other words, the controller 140 may control the sensor 110, the signal generator 120, the signal transmitter 130, and other components of the digital pen 100 to cause them to perform various actions described above with respect to the sensor 110, the signal generator 120, and the signal transmitter 130. The controller 140 may include a central processing unit (CPU), computer-readable storage medium, such as random access memory (RAM), read-only memory (ROM), flash memory, and the like, and various communication interfaces. The computer-readable storage medium may store instructions or logic configured to operate other components of the digital pen 100. In particular, the controller 140 may control the signal generator 120 to generate a touch signal based on battery information of the digital pen 100. Specifically, if the battery information of the digital pen 100 indicates that the battery voltage of the digital pen 100 is greater than or equal to a reference voltage, the controller 140 may control the signal generator 120 to generate a first EMI touch signal having a first frequency, and if the battery information of the digital pen 100 indicates that the battery voltage of the digital pen 100 is less than the reference voltage, the controller 140 may control the signal generator 120 to generate a second EMI touch signal having a second frequency.

Even though two EMI touch signals having different frequencies are generated using one reference voltage in the exemplary embodiment discussed above, the disclosure is limited in that regard. Three or more EMI touch signals may be generated using more than two reference voltages. For example, if the currently battery voltage is greater than or equal to a first reference voltage, the controller 140 may control the signal generator 120 to generate a first EMI touch signal having a first frequency. Similarly, if the current battery voltage is less than the first reference voltage and greater than or equal to a second reference voltage, the controller 140 may control the signal generator 120 to generate a second EMI touch signal having a second frequency. Finally, if the current battery voltage is less than the first reference voltage and the second reference voltage, the controller 140 may control the signal generator 120 to generate a third EMI touch signal having a third frequency.

In addition, the controller 140 may control the signal generator 120 to generate a touch signal having a different frequency depending on a battery voltage sensed by the sensor 110. For example, if the battery voltage sensed by the sensor 110 is 1.5 V, the controller 140 may control the signal generator 120 to generate an EMI touch signal of 300 MHz, if the battery voltage sensed by the sensor 110 is 1.0 V, the controller 140 may control the signal generator 120 to generate an EMI touch signal of 200 MHz, and if the battery voltage sensed by the sensor 110 is 0.5 V, the controller 140 may control the signal generator 120 to generate an EMI touch signal of 100 MHz.

Although, in the above exemplary embodiment, the controller 140 generates an EMI touch signal based on battery information as state information of the digital pen 100, the present disclosure is not limited in that regard. The controller 140 may generate an EMI touch signal based on other information of the digital pen 100. For example, the controller 140 may generate an EMI touch signal based on usage mode information of the digital pen 100 (e.g., "idle," "hover," "contact," "pressed," "write," "erase," etc.), user information, etc. In other words, if the digital pen 100 is in a first mode (e.g., write mode), the controller 140 may control the signal generator 120 to generate a first EMI touch signal having a first frequency, and if the digital pen 100 is in a second mode (e.g., erase mode), the controller 140 may control the signal generator 120 to generate a second EMI touch signal having a second frequency.

The controller 140 may also control the signal transmitter 130 to transmit a generated EMI touch signal to the display apparatus 200.

According to the above-described and other exemplary embodiments, the digital pen 100 may provide state information of the digital pen 100 to the display apparatus 200 using a touch signal without the need to generate a separate signal.

Figure 3:
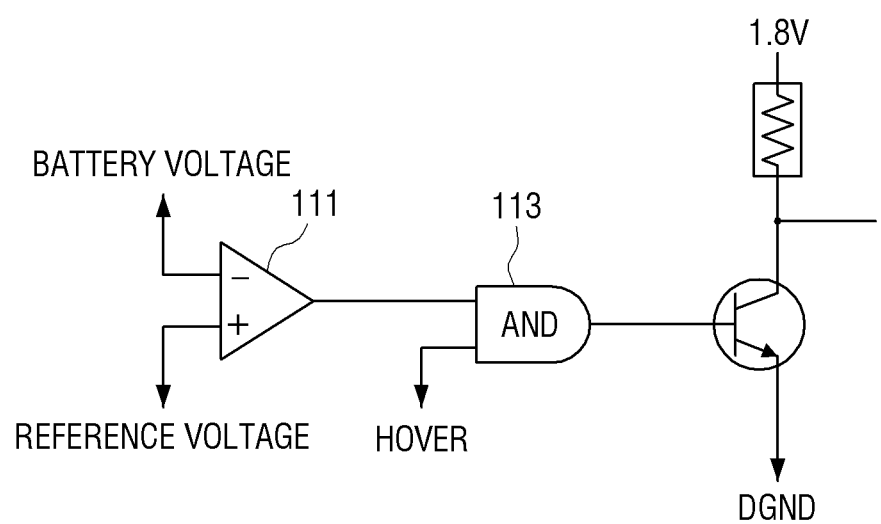
FIG. 3 is a block diagram illustrating a configuration of a sensor that senses battery information according to an exemplary embodiment.

FIG. 3 is a block diagram illustrating a configuration of the sensor 110 that senses battery information according to an exemplary embodiment.

The sensor 110 may include a comparer 111 that compares the current battery voltage of the digital pen 100 against a predetermined reference voltage (e.g., 0.4 V). As discussed above, one or more comparers may be connected in series to compare the battery voltage against multiple reference voltages. Optionally, the sensor 110 may include an AND gate 113 to conjunctively combine the output of the comparer 111 with additional inputs such as a specific usage state of the digital pen 100 (e.g., "hover" mode). Subsequently, the output of the comparer 111 or the optional AND gate 113 may activate or deactivate a switch that determines the output voltage of the sensor 110.

Figure 4A:
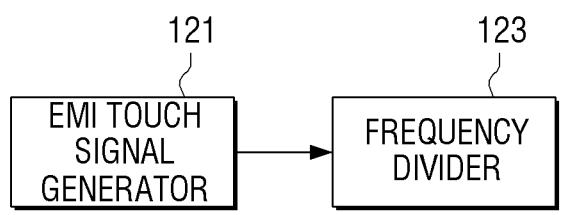
FIG. 4A is a block diagram illustrating a configuration of a signal generator that generates a touch signal according to an exemplary embodiment.

FIG. 4A is a block diagram illustrating a configuration of the signal generator 120 that generates a touch signal according to an exemplary embodiment.

In this exemplary embodiment, a frequency of an EMI touch signal may be changed using an oscillator or a crystal. As illustrated in FIG. 4A, the signal generator 120 may include an EMI touch signal generator 121 and a frequency divider 123. The EMI touch signal generator 121 may generate an EMI touch signal having a specific frequency using an oscillator or a crystal. For example, the EMI touch signal generator 121 may generate an EMI touch signal having a frequency of 600 KHz using an oscillator or a crystal. The frequency divider 123 may divide the EMI touch signal, generated by the EMI touch signal generator 121, according to a division ratio and output the divided signal to the signal transmitter 130. According to an aspect of an exemplary embodiment, the frequency divider 123 may divide an EMI touch signal according to a different division ratio depending on the battery status of the digital pen 100 under the control of the controller 140. For example, if the sensor 110 senses that the current battery voltage of the digital pen 100 is greater than or equal to a reference voltage, the frequency divider 123 may divide the EMI touch signal by the division ratio of 2:1, and output the EMI touch signal of 300 KHz. In another example, if the sensor 110 senses that the current battery voltage of the digital pen 100 is less than the reference voltage, the frequency divider 123 may divide the EMI touch signal by the division ratio of 3:1, and output the EMI touch signal of 200 KHz.

Figure 4B:
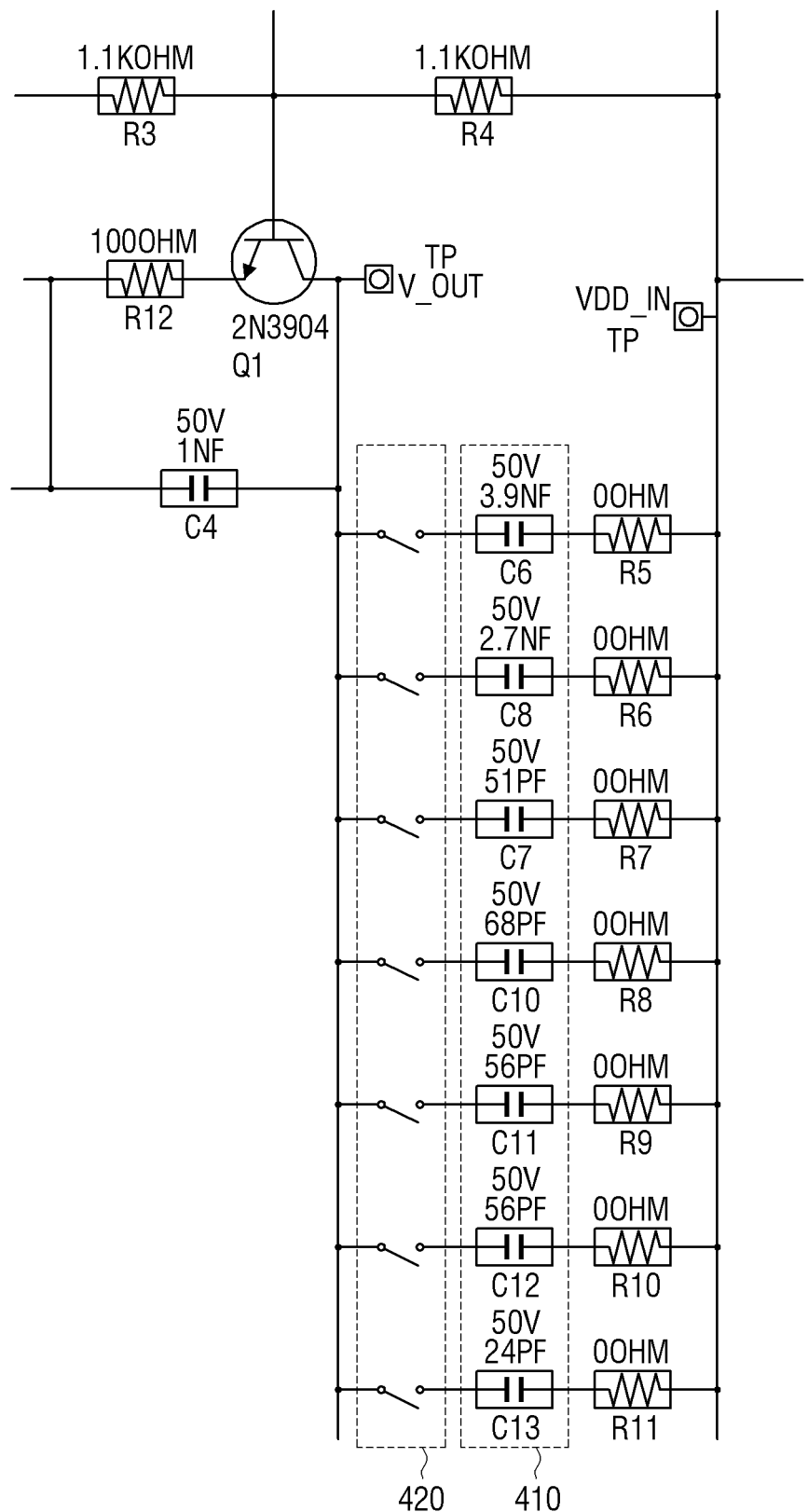
FIG. 4B is a diagram illustrating a circuit of a signal generator that generates a touch signal according to an exemplary embodiment.

FIG. 4B is a diagram illustrating a circuit of the signal generator 120 which generates a touch signal according to an exemplary embodiment. In this exemplary embodiment, a frequency of an EMI touch signal may be changed using an LC oscillation circuit. First of all, an LC oscillation circuit included in the signal generator 120 may generate an EMI touch signal having a predetermined frequency. According to an aspect of an exemplary embodiment, the LC oscillation circuit may control a plurality of switches 420 connected to a plurality of capacitors 410 under the control of the controller 140, and change the frequency of the EMI touch signal. The plurality of capacitors 410 may have varying degrees of capacitance such that depending on which of the plurality of switches 420 are activated, different capacitors will be connected in parallel to create the overall capacitance between "VDD_IN TP" and "TP V_OUT." Specifically, if the sensor 110 senses that the current battery voltage of the digital pen 100 is greater than or equal to a reference voltage, the LC oscillation circuit may turn on all of the plurality of switches 420, and conversely, if the sensor 110 senses that the current battery voltage of the digital pen 100 is less than the reference voltage, the LC oscillation circuit may turn off at least one of the plurality of switches 420. Accordingly, when it is sensed that the current battery voltage of the digital pen 100 is greater than or equal to the reference voltage, the LC oscillation circuit may generate an EMI signal having a first frequency, and when it is sensed that the current battery voltage of the digital pen 100 is less than the reference voltage, the LC oscillation circuit may generate an EMI touch signal having a second frequency.

Although FIG. 4B illustrates a switch is connected to each of the plurality of capacitors 410, this is only an example. Each of the plurality of switches 420 may be connected to one, only some, or all of the plurality of capacitors 410.

Figure 5:
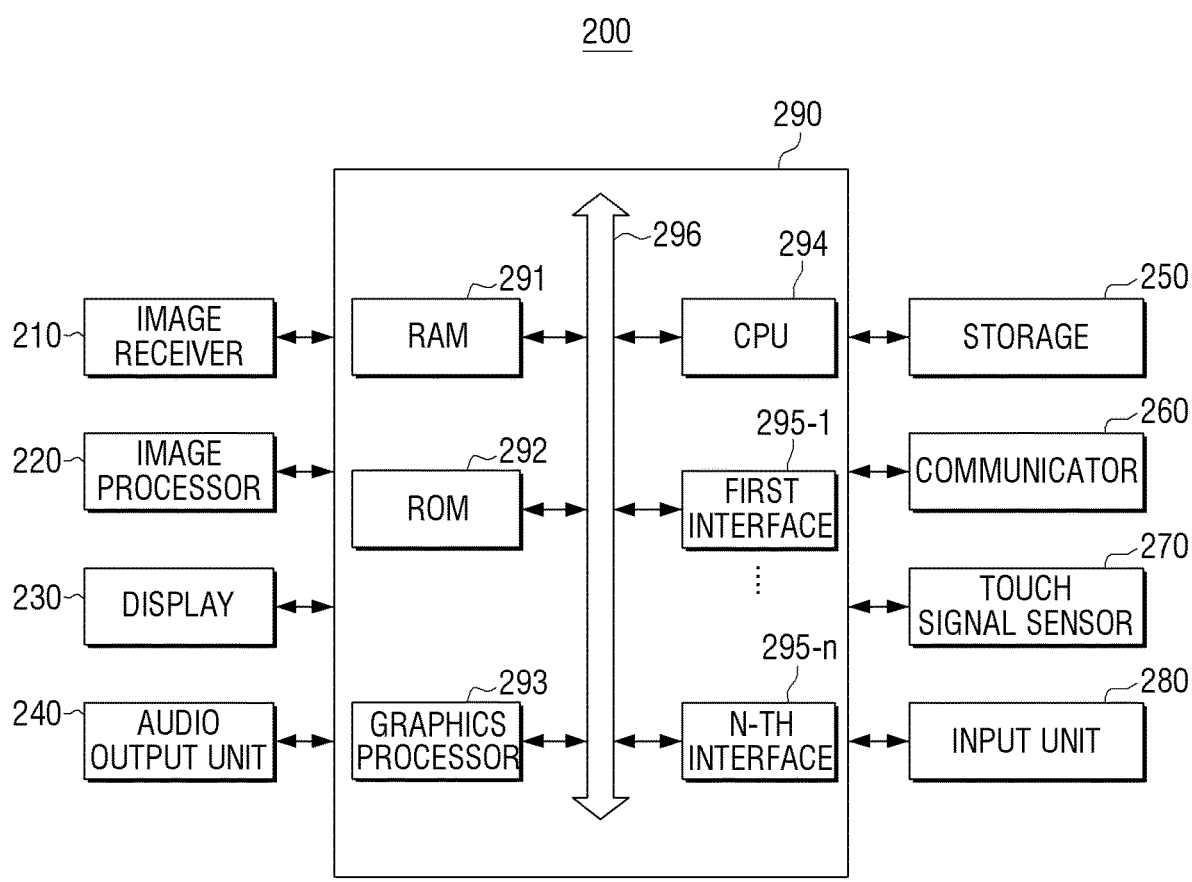
FIG. 5 is a block diagram illustrating a configuration of a display apparatus according to an exemplary embodiment.

FIG. 5 is a block diagram illustrating a configuration of a display apparatus 200 according to an exemplary embodiment.

As illustrated in FIG. 5, the display apparatus 200 includes an image receiver 210, an image processor 220, a display 230, an audio output unit 240, a storage 250, a communicator 260, a touch signal sensor 270, an input unit 280, and a controller 290.

The image receiver 210 may receive various types of image content from other devices. Specifically, the image receiver 210 may receive broadcast content from an external broadcasting station, image content from an external apparatus (e.g., a Digital Versatile Disc (DVD) player, etc.), or video on demand (VOD) content from an external server.

The image processor 220 may perform image processing with respect to image data acquired from the image receiver 210. The image processor 220 may perform various types of image processing with respect to image data, such as decoding, scaling, noise filtering, frame rate conversion, resolution conversion, etc.

The display 230 may display image content received from the image receiver 210 and/or various graphic user interface elements processed from a graphics processor 293. In particular, the display 230 may display a graphical object or move the displayed graphical object according to a touch input received from the digital pen 100. The display 230 may be, for example, a liquid crystal display (LCD), light-emitting diode (LED) display, organic light-emitting diode (OLED) display, active-matrix organic light-emitting diode (AMOLED) display, etc.

The audio output unit 240 may output not only various audio data processed by an audio processor but also various alarm sounds and voice messages.

The storage 250 may store various modules to drive the display apparatus 200. For example, the storage 250 may store software instructions including a base module, a sensing module, a communication module, a presentation module, a web browser module, and a service module. The base module may refer to a basic module that processes a signal transmitted from each hardware component included in the display apparatus 200, and transmits the processed signal to an upper layer module. The sensing module may collect information from various sensors, and analyze and manage the collected information. The sensing module may also include a face recognition module, a voice recognition module, a motion recognition module, a near field communication (NFC) recognition module, and so on. The presentation module may compose graphical elements on a display screen, and may include a multimedia module for reproducing and outputting multimedia content, and a UI rendering module for UI and graphics processing. The communication module may enable communication with external devices. The web browser module may facilitate web browsing to access a web server. The service module may include various applications for providing various services As described above, the storage 250 may include various program modules, but some of the program modules described above may be omitted or substituted, and other modules heretofore not discussed may be added according to the type and characteristics of the display apparatus 200. For example, if the display apparatus 200 is a tablet computing device, the base module may further include a location determination module to determine the location of the device based on Global Positioning System (GPS) coordinates, and the sensing module may further include a module to sense a user's operation.

In addition, the storage 250 may map the frequency of a touch signal with the state information of the digital pen 100 and store the mapping information. For example, the storage 250 may map the frequency of an EMI touch signal with the battery information of the digital pen 100 and store the mapping information.

The communicator 260 may communicate with various types of external apparatuses according to various types of communication methods and protocols. The communicator 260 may include various communication modules or chips such as a Wi-Fi module, a Bluetooth module, an NFC module, a wireless communication module, etc. The Wi-Fi module, the Bluetooth module, and the NFC module may communicate according to a Wi-Fi protocol, a Bluetooth protocol, and an NFC protocol, respectively. The NFC module may be an integrated circuit which operates according to the NFC protocol using a band of 13.56 MHz from among various radio-frequency identification (RFID) frequency bands such as 135 kHz, 13.56 MHz, 433 MHz, 860-960 MHz, 2.45 GHz, etc. When the Wi-Fi module or the Bluetooth module is used, a variety of connectivity information such as a service set identifier (SSID) and a session key may be exchanged first, and the communication may be established using the connectivity information. Then a variety of information may be exchanged. The wireless communication module may refer to an integrated circuit which performs communication according to various communication standards and protocols such as Institute of Electrical and Electronics Engineers (IEEE), Zigbee, third generation (3G), 3rd Generation Partnership Project (3GPP), Long-Term Evolution (LTE), etc.

The touch signal sensor 270 may sense a touch signal output by the digital pen 100. In particular, the touch signal sensor 270 may include a sensor sheet to sense an EMI signal output from the digital pen 100. Accordingly, the touch signal sensor 270 may recognize a point where an EMI signal is sensed in the sensor sheet as a point touched by the digital pen 100.

Although the touch signal sensor 270 senses touch coordinates using an EMI signal in the exemplary embodiment described above, the present disclosure is not limited in that regard. The touch coordinates may be sensed by using a radio frequency (RF) signal, an infrared (IR) signal, an ultrasonic signal, or a static electricity signal output from the digital pen 100.

The input unit 280 may detect and receive various user manipulations to control the display apparatus 200. In particular, the input unit 280 may be implemented with various input apparatuses such as a remote controller, a voice input unit, a motion input unit, a pointing device, etc. to receive a user command or manipulation.

The controller 290 may control the overall operations of the display apparatus 200 using various programs stored in the storage 250.

As illustrated in FIG. 5, the controller 290 may include a RAM 291, a ROM 292, a graphics processor 293, a CPU 294, first to n-th interfaces 295-1-295-n (collectively "295"), and a bus 296. In this case, the RAM 291, the ROM 292, the graphics processor 293, the CPU 294, and the first to the n-th interfaces 295 may be connected to one another through the bus 296.

The ROM 292 may store a set of commands for booting the system. When a turn-on command is received and the power is supplied, the CPU 294 may copy program instructions pertaining to an operating system (OS) stored in the storage 250 into the RAM 291 according to a command stored in the ROM 292, and boot the system by executing the OS. When the boot sequence is complete, the CPU 294 may copy various application programs stored in the storage 250 into the RAM 291, and perform various operations by executing the application programs copied into the RAM 291.

The graphics processor 293 may generate a screen image that includes various graphical objects such as an icon, an image, a text, etc., by using a calculator and a renderer. The calculator may calculate attribute values of the graphical objects to be displayed according to a layout of the screen, such as a coordinate value, a shape, a size, a color, etc., based on a control command received from the input unit 280. The renderer may generate a screen of various layouts including objects based on the attribute values calculated by the calculator. The screen image generated by the renderer may be displayed in the display area of the display 230.

The CPU 294 may access the storage 250 and perform the boot sequence using the OS stored in the storage 250. In addition, the CPU 294 may perform various operations using various programs, content, data, etc. that are stored in the storage 250.

The first to the n-th interfaces 295 may be connected with the various components described above. One of the first to the n-th interfaces 295 may be a network interface, which may communicate with an external device via a network.

Meanwhile, the controller 290 may acquire state information regarding a point touched by the digital pen 100 and the digital pen 100 itself by analyzing the touch signal output from the digital pen 100. In particular, the controller 290 may acquire state information of the digital pen 100 by analyzing the frequency of the touch signal. Specifically, if the frequency of the touch signal is a first frequency, the controller 290 may acquire state information corresponding to the first frequency, and if the frequency of the touch signal is a second frequency, the controller 290 may acquire state information corresponding to the second frequency.

Figure 6A:
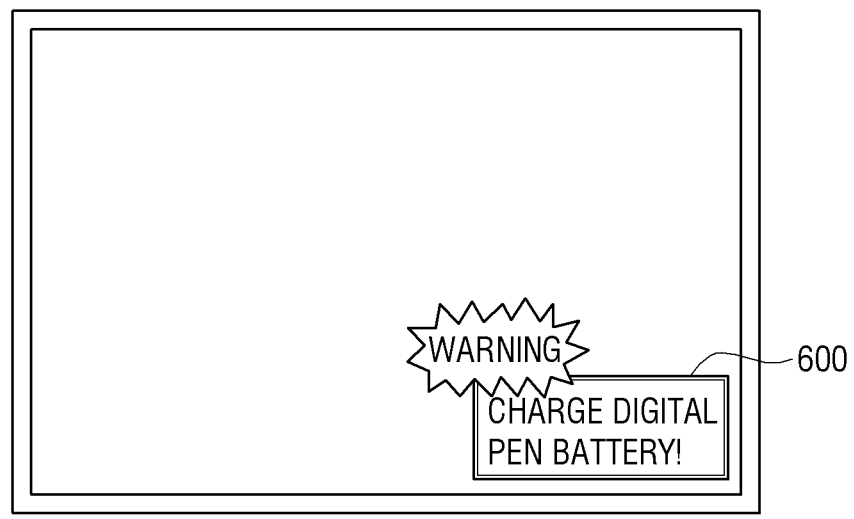
FIGS. 6A and 6B are views illustrating a battery information user interface (UI) provided by a display apparatus according to an exemplary embodiment.

As an illustration, if a frequency of an EMI touch signal is 250 KHz, the controller 290 may determine that the battery voltage of the digital pen 100 is greater than or equal to a reference voltage, and if the frequency of the EMI touch signal is 200 KHz, the controller 290 may determine that the battery voltage of the digital pen 100 is less than the reference voltage. In particular, as illustrated in FIG. 6A, if it is determined that the battery voltage is less than the reference voltage, the controller 290 may control the display 230 to display in one area of the display 230 a message 600 requesting to charge the battery. Alternatively or in conjunction with the aforementioned, the controller 290 may control the audio output unit 240 to output a voice message requesting to charge the battery.

Figure 6B:
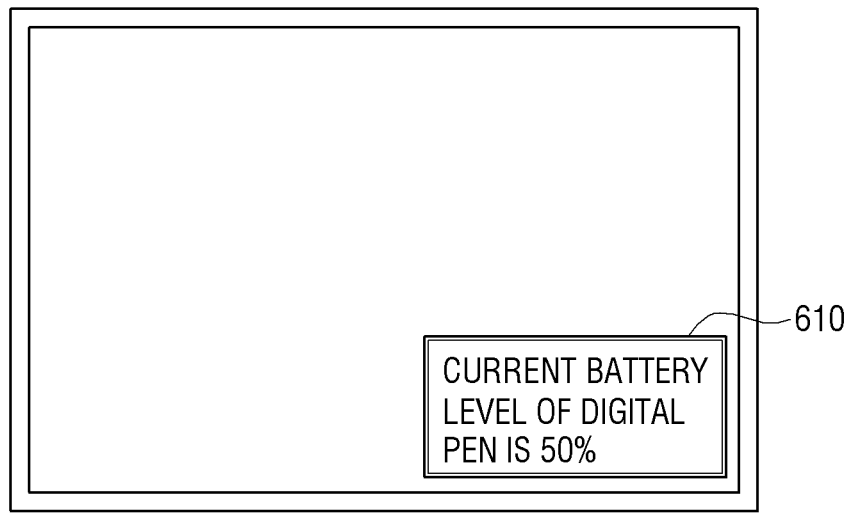

According to an aspect of an exemplary embodiment, if a frequency of an EMI touch signal is 200 KHz, the controller 290 may determine that the corresponding battery voltage of the digital pen 100 is 10 V. In addition, as illustrated in FIG. 6B, the controller 290 may control the display 230 to display a message 610, which contains information regarding the current battery level. Alternatively or in conjunction with the aforementioned, the controller 290 may control the audio output unit 240 to output a voice message informing of the current battery voltage.

Although the display apparatus 200 is described as sensing a touch signal including battery information and outputting the battery information in the exemplary embodiment described above, the present disclosure is not limited in that regard. The display apparatus 200 may sense a touch signal that includes other information of the digital pen 100 to provide other information or perform a function corresponding to such information.

Figure 7:
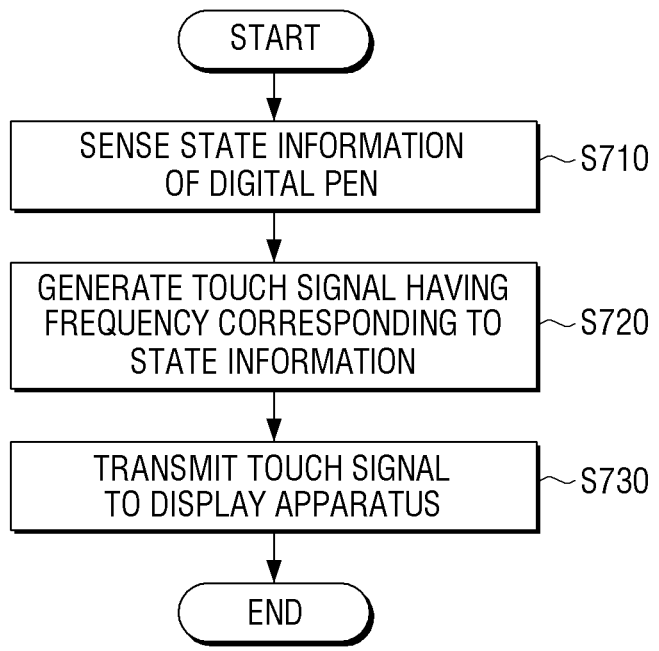
FIG. 7 is a flowchart illustrating a method for providing information about a digital pen according to an exemplary embodiment.

FIG. 7 is a flowchart illustrating a method for providing information about the digital pen 100 according to an exemplary embodiment.

The digital pen 100 may sense state information of the digital pen 100 (S710). The digital pen 100 may determine whether the battery information indicates that the battery voltage of the digital pen 100 is greater than or equal to a predetermined value.

The digital pen 100 may generate a touch signal having a frequency corresponding to the state information (S720). Specifically, if the battery of the digital pen 100 is greater than or equal to the predetermined value, the digital pen 100 may generate a first touch signal having a first frequency, and if the battery of the digital pen 100 is less lower than the predetermined value, the digital pen 100 may generate a second touch signal having a second frequency.

The digital pen 100 may transmit the generated touch signal to the display apparatus 200 (S730).

FIG. 8 is a sequence diagram illustrating a method for providing information about a touch system 10 according to an exemplary embodiment.

First, the digital pen 100 may sense state information of the digital pen 100 (S810). The state information may include battery information of the digital pen 100. The digital pen 100 may generate a touch signal having a frequency corresponding to the state information of the digital pen 100 (S820). The digital pen 100 may transmit the touch signal to the display apparatus 200 (S830).

The display apparatus 200 may analyze the touch signal (S840), and acquire touch information regarding a point touched by the digital pen 100 and state information of the digital pen 100 (S850). The display apparatus 200 may display a graphical object based on the touch information and output the state information of the digital pen 100.

Although FIG. 8 describes that the touch signal is an EMI touch signal, the present disclosure is not limited in that regard. The touch signal may be implemented with other means. For example, the touch signal may be implemented with an RF signal, an IR signal, or an ultrasonic signal.

Specifically, if the touch signal is an RF signal, the signal generator 130 may generate an RF touch signal by modulating the RF touch signal according to state information of the digital pen 100. In this case, the signal generator 130 may modulate the RF signal using an amplitude-shift keying (ASK) modulation method, a frequency-shift keying (FSK) modulation method, etc. If the ASK modulation method is used, the signal generator 130 may generate an RF touch signal including data (e.g., "1010") corresponding to the battery information by modulating the amplitudes of the RF touch signal. If the FSK modulation method is used, the signal generator 130 may generate an RF touch signal including data (e.g., "1010") corresponding to the battery information by modulating the frequencies of the RF signal. The display apparatus 200 may not only receive the RF touch signal to acquire touch information regarding a point touched by the digital pen 100 but also use the data included in the RF touch signal to check battery information of the digital pen 100.

If the touch signal is an IR signal, the signal generator 130 may insert data to an IR touch signal according to state information of the digital pen 100. Specifically, if it is determined that the battery voltage of the digital pen 100 is less than a predetermined value, the signal generator 130 may generate an IR touch signal by inserting first data (e.g., "101010") to the IR touch signal, and if it is determined that the battery voltage of the digital pen 100 is greater than the predetermined value, the signal generator 130 may generate an IR touch signal by inserting second data (e.g., "101111") to the IR touch signal.

If the touch signal is an ultrasonic signal, the signal generator 130 may generate an ultrasonic touch signal by changing a frequency of the ultrasonic signal according to state information of the digital pen 100. Specifically, if it is determined that the battery voltage of the digital pen 100 is less than a predetermined value, the signal generator 130 may generate an ultrasonic touch signal having a first frequency, and if it is determined that the battery voltage of the digital pen 100 is greater than the predetermined value, the signal generator 130 may generate an ultrasonic touch signal having a second frequency.

If the touch detection method is a capacitive method, the signal generator 130 may generate a touch signal by changing capacitance provided by the digital pen 100 according to state information of the digital pen 100. In other words, if it is determined that the current battery voltage of the digital pen 100 is less than a reference voltage, the signal generator 130 may generate a touch signal by boosting up the capacitance higher than that of a normal state.

In other words, according to the various touch methods described above, a touch signal may be generated according to state information. Accordingly, the digital pen 100 may transmit information regarding the digital pen 100 to the display apparatus 200 without having to generate a separate signal.

In addition, the various technical features described above can be applied when the digital pen 100 is using a plurality of touch methods. Specifically, when the digital pen 100 is in a hover state (i.e., when the digital pen 100 is placed at a predetermined distance away from a touch surface of the display apparatus 200 without being in direct contact with the surface), an EMI touch signal may be used, and when the digital pen 100 is in a state of direct contact, an IR touch signal may be used. In such an example, when the digital pen 100 is in the hover state, the signal generator 130 may generate an EMI touch signal by changing a frequency of the EMI touch according to state information of the digital pen 100, and if the digital pen 100 is in the direct touch state, the signal generator 130 may insert data corresponding to the state information of the digital pen 100 to the IR touch signal.

Although the battery information is taken as an example of state information of the digital pen 100 in the exemplary embodiment described above, the present disclosure is not limited in that regard. A touch signal may be generated by using other types of information of the digital pen 100. Hereinafter, an exemplary embodiment of generating a touch signal using other types of information of the digital pen 100 will be described with reference to FIGS. 9A to 12B.

Figure 9A:
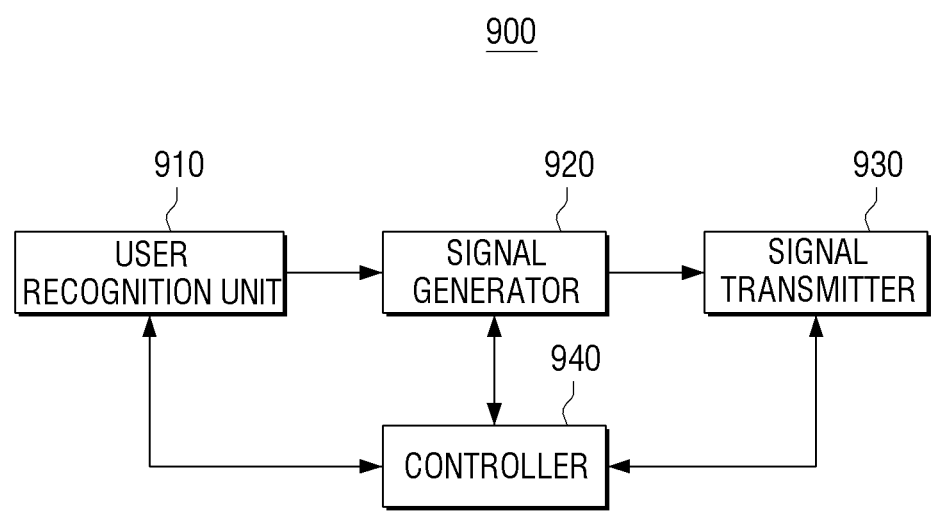
FIG. 9A is a block diagram illustrating a configuration of a digital pen according to an exemplary embodiment.

FIG. 9A is a block diagram illustrating a configuration of a digital pen 900 according to an exemplary embodiment.

As illustrated in FIG. 9A, the digital pen 900 may include a user recognition unit 910, a signal generator 920, a signal transmitter 930, and a controller 940. The descriptions pertaining to those features of the digital pen 100 that are similar to the features of the digital pen 900 may also apply to the digital pen 900. For example, the digital pen 900 may be substantially similar to the digital pen 100 except those features that are unique to the digital pen 900, as will be described further.

Figure 9B:
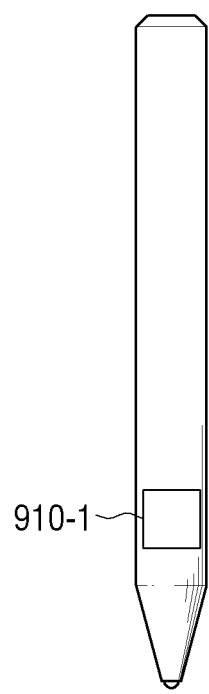
FIG. 9B is a view illustrating a digital pen according to an exemplary embodiment.

The user recognition unit 910 may recognize a user of the digital pen 900. Specifically, as illustrated in FIG. 9B, the user recognition unit 910 may recognize the user by using a fingerprint recognition unit 910-1, which may be provided on the lower portion of the digital pen 900 towards the tip of the digital pen 900 such that the fingerprint recognition unit 910-1 may recognize the user's fingerprint. Alternatively, the user recognition unit 910 may recognize the user by using the user's voice, the user's iris, a personal identification number (PIN), etc.

The signal generator 920 may generate a touch signal corresponding to a recognized user. In other words, the signal generator 920 may generate a touch signal such that the touch signal has a frequency corresponding to the recognized user.

The signal generator 930 may output a touch signal generated by the signal generator 920 to the display apparatus 200.

The controller 940 may control the signal generator 920 to generate a touch signal based on the recognized user information. Specifically, if a pre-registered user, User A, is recognized through the user recognition unit 910, the controller 940 may control the signal generator 920 to generate a first touch signal having a first frequency corresponding to User A, and if a pre-registered user, User B, is recognized through the user recognition unit 910, the controller 940 may control the signal generator 920 to generate a second touch signal having a second frequency corresponding to User B. The controller 940 may also control the signal transmitter 930 to transmit the generated touch signal to the display apparatus 200.

Figure 10A:
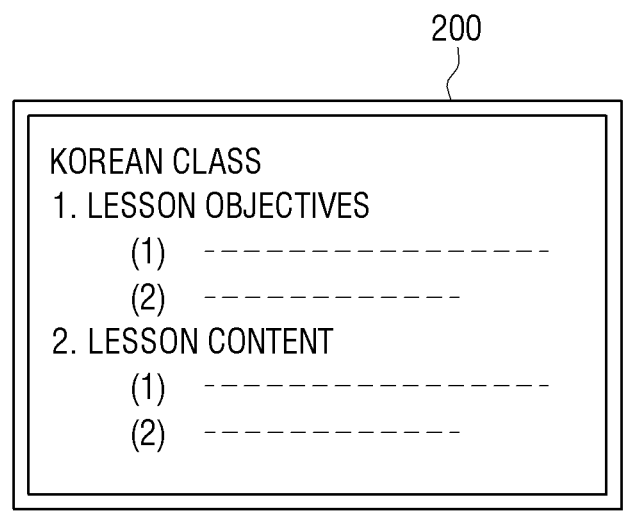
FIGS. 10A and 10B are views illustrating a display apparatus displaying information based on a touch signal generated by a digital pen according to various exemplary embodiments.
Figure 10B:
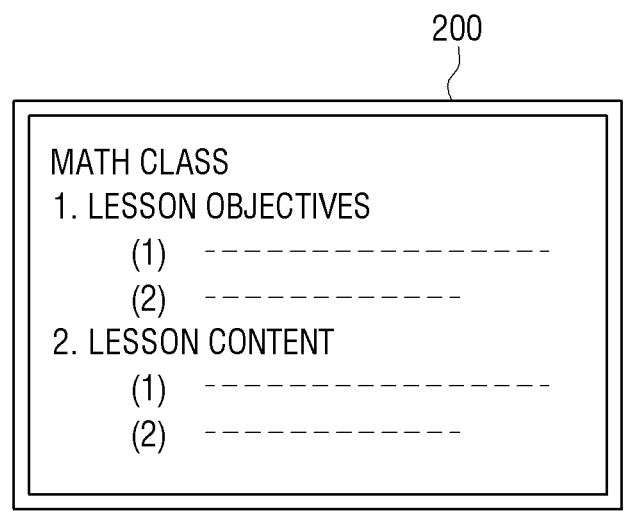

The display apparatus 200 may recognize a user of the digital pen 900 according to a touch signal transmitted from the digital pen 900. In particular, for example, if the display apparatus 200 is an electronic blackboard and the user of the digital pen 900 is a teacher, the display apparatus 200 may configure a class screen customized according to the recognized user by analyzing the touch signal. Specifically, if User A, corresponding to the first touch signal, is recognized, the display apparatus 200 may display a Korean language class screen that corresponds to User A, as illustrated in FIG. 10A. Alternatively, if User B, corresponding to the second touch signal, is recognized, the display apparatus 200 may display a math class screen that corresponds to User B, as illustrated in FIG. 10B.

In these examples, the display apparatus 200 may also provide a class screen that corresponds to the progress of the learner, the content of the user's writing, etc.

FIG. 11 is a sequence diagram illustrating a method of providing information of the touch system 10 according to an exemplary embodiment.

First, the digital pen 900 may acquire user information (S1110). Specifically, as described above, the digital pen 900 may recognize a user by using a fingerprint, an iris, a voice, a PIN, etc., and acquire user information corresponding to the recognized user. The digital pen 900 may generate a touch signal having a frequency corresponding to the acquired user information (S1120). Specifically, if a first user is recognized, the digital pen 900 may generate a first touch signal having a first frequency, and if a second user is recognized, the digital pen 900 may generate a second touch signal having a second frequency. The digital pen 900 may transmit the generated touch signal to the display apparatus 200 (S1130).

The display apparatus 200 may analyze the touch signal (S1140). Specifically, the display apparatus 200 may recognize a user of the digital pen 900 by analyzing the touch signal. The display apparatus 200 may display a screen corresponding to the user information based on the analysis result (S1150). Specifically, if the first user is recognized, the display apparatus 200 may display a screen corresponding to the first user, and if the second user is recognized, the display apparatus 200 may display a screen corresponding to the second user.

Figure 12A:
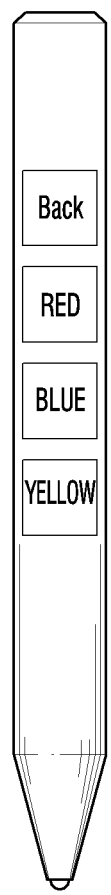
FIGS. 12A and 12B are views illustrating digital pens with buttons according to an exemplary embodiment.

According to an aspect of an exemplary embodiment, the digital pen 100 may generate a touch signal having a different frequency depending on an operation mode of the digital pen 100. Specifically, as illustrated in FIG. 12A, the digital pen 100 may include one or more buttons corresponding to colors on the outer surface of the digital pen 100. When a user selects one of the colored buttons, the digital pen 100 may generate a touch signal having a frequency that corresponds to the selected color. For example, if the user selects black, the digital pen 100 may generate an EMI touch signal of 200 kHz, which is the frequency that corresponds to the selected color, black. Alternatively, if the user selects red, the digital pen 100 may generate an EMI touch signal of 205 kHz, which is the frequency that corresponds to the selected color, red. The display apparatus 200 may determine a color mode of the digital pen 100 by analyzing the frequency of the touch signal, and display a graphical object in the color corresponding to the determined color mode at the touched point. Thus, for example, if the user is drawing a picture using a "draw" tool on a drawing application executing on the display apparatus 200 and presses a button assigned to color red on the digital pen 100, the display apparatus 200 may change the color of the "draw" tool inside the drawing application to color red.

Figure 12B:
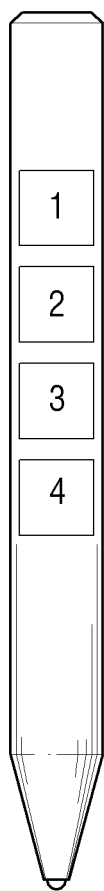

According to an aspect of an exemplary embodiment, as illustrated in FIG. 12B, the digital pen 100 may include a plurality of number buttons on the outer surface of the digital pen 100. When a user selects at least one of the plurality of number buttons, the digital pen 100 may generate a touch signal having a different frequency according to a writing mode corresponding to the selected number(s). For example, if the numbers 1 and 3 are selected from among the plurality of number buttons, the digital pen 100 may convert to the "5 mm pen" writing mode, and generate a touch signal having a frequency corresponding to the "5 mm pen" Writing mode. If the numbers 1 and 2 are selected from among the plurality of number buttons, the digital pen 100 may convert the writing mode to the "3 mm pen" mode, and generate a touch signal having a frequency corresponding to the "3 mm pen" Mode. If the numbers 2 and 4 are selected from among the plurality of number buttons, the digital pen 100 may convert the writing mode to the "delete" mode, and generate a touch signal having a frequency corresponding to the "delete" mode.

Thus, according to the various exemplary embodiments described above, the digital pen 100 may offer a variety of convenient and easy-to-use features to a user.

Meanwhile, the various exemplary embodiments described above for providing information of a digital pen may be implemented with a software program and provided in a display apparatus or an input apparatus. In particular, a software program including the method of controlling a display apparatus may be stored in a non-transitory computer readable medium and provided therein.

The non-transitory recordable medium refers to a medium which may store data semi-permanently rather than storing data for a short time, such as a register, a cache, a memory, etc. and is readable by an apparatus. Specifically, the various applications and programs described above may be stored and provided in a non-transitory recordable medium such as a compact disc (CD), a DVD, a hard disk, a solid-state drive (SSD), a Blu-ray disc, a Universal Serial Bus (USB) device, a memory card, a flash memory, ROM, etc.

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art. The word "exemplary" is used herein to mean "serving as an example or illustration." Any aspect or design described herein as "exemplary" is not necessarily to be construed as preferred or advantageous over other aspects or designs. Moreover, claim language reciting "at least one of" a set indicates that one member of the set or multiple members of the set satisfy the claim.

What is claimed is:

1. A system comprising:
a display apparatus; and
a stylus configured to:
    identify a user of the stylus and a stylus usage mode, wherein the stylus usage mode is identified based on an input associated with at least two buttons combination that is selected from among a plurality of buttons on the stylus,
    generate a first signal having a first frequency corresponding to the at least two buttons combination that is selected from among the plurality of buttons on the stylus and a second signal having a second frequency corresponding to the identified user, and
transmit the first signal and the second signal to the display apparatus,
wherein the display apparatus is configured to receive the first signal and perform a function corresponding to the at least two buttons combination as indicated by the first frequency of the first signal,
wherein the display apparatus is configured to receive the second signal from the stylus, identify the user of the stylus based on the second signal received, and display a screen according to the identified user,
wherein the display apparatus is configured to, based on identifying a first user, display a first screen corresponding to the identified first user, and based on identifying a second user, display a second screen corresponding to the identified second user, and
wherein the first screen is different from the second screen.

2. The system as claimed in claim 1, wherein the stylus comprises a battery and is further configured to generate a third signal having a third frequency corresponding to power of the battery, and
wherein the display apparatus is further configured to, in response to receiving the third signal, display a message indicating that the battery of the stylus has low power.

3. A method comprising:
identifying, by a stylus, a user of the stylus and a stylus usage mode, wherein the stylus usage mode is identified based on an input associated with at least two buttons combination that is selected from among a plurality of buttons on the stylus;
generating, by the stylus, a first signal having a first frequency corresponding to the at least two buttons combination that is selected from among the plurality of buttons on the stylus and a second signal having a second frequency corresponding to the identified user;
transmitting the first signal and the second signal from the stylus to a display apparatus;
based on the first signal received from the stylus, perform, by the display apparatus, a function corresponding to the at least two buttons combination as indicated by the first frequency of the first signal; and
based on the second signal received from the stylus, identifying, by the display apparatus, the user of the stylus and displaying, by the display apparatus, a screen according to the identified user,
wherein the displaying further comprising displaying, based on identifying a first user by the display apparatus a first screen corresponding to the identified first user, and displaying, based on identifying a second user, a second screen corresponding to the identified second user, and
wherein the first screen is different from the second screen.

4. The method as claimed in claim 3, further comprising:
acquiring, by the display apparatus, a battery status information of a battery of the stylus;
generating, by the stylus, a third signal having a third frequency based on the battery status information; and
displaying, by the display apparatus, a message indicating that the battery of the stylus has low power.

5. A stylus, comprising:
a signal generator;
a signal transmitter; and
a processor configured to:
identify a user of the stylus and a stylus usage mode, wherein the stylus usage mode is identified based on an input associated with at least two buttons combination that is selected from among a plurality of buttons on the stylus,
control the signal generator to generate a first signal having a first frequency corresponding to the at least two buttons combination that is selected from among the plurality of buttons on the stylus and a second signal having a second frequency corresponding to the identified user of the stylus, and
control the signal transmitter to transmit the first signal and the second signal from the stylus to a display apparatus,
wherein the display apparatus is configured to receive the first signal and perform a function corresponding to the at least two buttons combination as indicated by the first frequency of the first signal,
wherein the display apparatus is configured to, based on receiving the second signal received from the stylus, identify the user of the stylus, and display a screen according to the identified user,
wherein the display apparatus is configured to, based on identifying a first user, display a first screen corresponding to the identified first user, and based on identifying a second user, display a second screen corresponding to the identified second user, and
wherein the first screen is different from the second screen.

6. The stylus as claimed in claim 5, wherein the first signal or the second signal is an electromagnetic signal, and
wherein the signal generator comprises an oscillation circuit configured to generate the electromagnetic signal by switching a capacitor included in the oscillation circuit.

7. The stylus as claimed in claim 5, further comprising:
an input unit configured to receive an input associated with a color mode,
wherein the signal generator is further configured to generate a third signal corresponding to the color mode selected via the input unit, and
wherein the signal transmitter is further configured to transmit the third signal corresponding to the color mode to the display apparatus.

* * * * *